(12) United States Patent
Durowoju et al.

(10) Patent No.: US 9,538,422 B2
(45) Date of Patent: Jan. 3, 2017

(54) BLIND MOBILITY LOAD BALANCING BETWEEN SOURCE AND TARGET CELLS

(71) Applicant: CISCO TECHNOLOGY, INC., San Jose, CA (US)

(72) Inventors: Olasunkanmi Adio Durowoju, Swindon (GB); Gbenga Kabir Salami, Swindon (GB); Colin J. Kellett, Wiltshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 90 days.

(21) Appl. No.: 14/663,271

(22) Filed: Mar. 19, 2015

(65) Prior Publication Data

US 2016/0277965 A1 Sep. 22, 2016

(51) Int. Cl.
*H04W 28/08* (2009.01)
*H04L 12/825* (2013.01)
*H04L 12/931* (2013.01)

(52) U.S. Cl.
CPC .............. *H04W 28/08* (2013.01); *H04L 47/25* (2013.01); *H04L 49/501* (2013.01)

(58) Field of Classification Search
CPC .... H04W 8/12; H04W 24/02; H04W 28/0247; H04W 28/0289; H04W 28/08; H04W 36/0016; H04W 36/0083; H04W 36/08; H04W 36/10; H04W 36/12; H04W 36/14; H04W 36/16; H04W 36/22; H04W 36/24; H04W 48/18; H04W 48/20; H04W 52/16; H04W 52/40; H04W 52/343; H04W 64/00; H04W 72/00; H04W 72/1252; H04W 84/12; H04W 88/16; H04W 92/045; H04W 48/16; H04W 72/0486; H04W 88/08; H04L 12/70; H04L 12/5695; H04L 41/0896; H04L 43/0876; H04L 47/125; H04L 47/762; H04L 47/765; H04L 47/801; H04L 47/822; H04L 47/824; H04L 43/0882; H04L 43/16; H04L 47/25; H04L 49/501

See application file for complete search history.

(56) References Cited

U.S. PATENT DOCUMENTS 8,428,610 B2 * 4/2013 Chowdhury ........ H04L 12/5695
370/329
8,676,186 B2 * 3/2014 Niu ..................... H04L 43/0882
455/422.1

(Continued)

*Primary Examiner* — Tri H Phan
(74) *Attorney, Agent, or Firm* — Patent Capital Group

(57) ABSTRACT

An example method is provided and includes monitoring a plurality of neighboring nodes to detect attempts to perform mobility load balancing by the neighboring nodes; detecting an attempt to perform mobility load balancing by at least one neighboring node; determining an identity of the at least one of the neighboring nodes; and setting an offset parameter for the identified neighboring node(s) to an optimal value. The monitoring may include monitoring a number of handover requests received within a predetermined time period. The detecting may include detecting that the number of handover requests received within the predetermined time period exceeds a predetermined number. The determining may include determining a source of each of the received handover requests, which may be accomplished by examining a user equipment history included in each of the received handover requests or by performing an iterative elimination process with respect to the neighboring nodes.

21 Claims, 4 Drawing Sheets

(56) References Cited

U.S. PATENT DOCUMENTS

| | | | |
|---|---|---|---|
| 8,958,812 B2* | 2/2015 | Weiguo | H04L 43/0882 |
| | | | 455/422.1 |
| 8,995,262 B2* | 3/2015 | Chowdhury | H04L 12/5695 |
| | | | 370/230 |
| 2011/0171952 A1* | 7/2011 | Niu | H04L 43/0882 |
| | | | 455/422.1 |
| 2013/0003547 A1* | 1/2013 | Motwani | H04W 28/08 |
| | | | 370/235 |
| 2013/0109389 A1 | 5/2013 | Olofsson et al. | |
| 2013/0170362 A1 | 7/2013 | Futaki et al. | |
| 2013/0223403 A1 | 8/2013 | Chen et al. | |
| 2013/0316709 A1 | 11/2013 | Watanabe et al. | |
| 2014/0031006 A1 | 1/2014 | Moore et al. | |
| 2014/0099954 A1* | 4/2014 | Choi | H04W 28/08 |
| | | | 455/436 |
| 2014/0135031 A1* | 5/2014 | Weiguo | H04L 43/0882 |
| | | | 455/453 |
| 2014/0148165 A1* | 5/2014 | Serravalle | H04W 16/14 |
| | | | 455/436 |
| 2014/0148174 A1 | 5/2014 | Teyeb et al. | |
| 2014/0198659 A1* | 7/2014 | Vargas Bautista | H04W 28/08 |
| | | | 370/236 |
| 2014/0233386 A1* | 8/2014 | Jamadagni | H04W 36/22 |
| | | | 370/235 |
| 2014/0269364 A1 | 9/2014 | Knapp et al. | |
| 2014/0301277 A1 | 10/2014 | Ueda | |
| 2014/0302853 A1 | 10/2014 | Militano et al. | |
| 2015/0031360 A1* | 1/2015 | Choi | H04W 36/22 |
| | | | 455/436 |
| 2015/0044974 A1 | 2/2015 | Futaki et al. | |
| 2015/0141014 A1* | 5/2015 | Huang | H04W 36/0083 |
| | | | 455/436 |

* cited by examiner

BLIND MOBILITY LOAD BALANCING BETWEEN SOURCE AND TARGET CELLS

TECHNICAL FIELD

This disclosure relates in general to the field of communications networks and, more particularly, to techniques for blind mobility load balancing between source and target cells in such networks.

BACKGROUND

Mobility load balancing ("MLB") as a feature of a self-organizing network ("SON") is used to correct traffic imbalance between network cells. MLB can be viewed from the perspective of offloading traffic only from an overloaded serving cell to under-loaded neighbor cells. In this situation, overload thresholds and under-load thresholds are configured and MLB is invoked once the threshold conditions are met. In live networks, situations may arise in which a serving cell becomes relatively loaded with respect to neighboring cells. Users in such a situation experience severe service degradation. At the same time, under-loaded neighboring cells are under-utilized, leading to a stark disparity in the quality of service ("QoS") experienced by users across cells of same access network. MLB aims to correct such traffic imbalances by enabling mechanisms to allow for "load sharing" between cells such that an overloaded cell (also referred to as the "source cell") can offload a portion of the traffic that it serves to relatively under-loaded neighbor cells (also referred to as "target cells"). In a multi-cell scenario, it becomes possible for a loaded cell to offload portions of the traffic that it serves to multiple collaborating target cells in order to improve cell-wide spectrum efficiency, QoS, and quality of experience ("QoE"), and reduce blocking probability within the loaded cell.

A small cell supports the ability to load-balance between cells in a grid (also referred to as "intra-tier MLB") and can also support load-balancing with macro/pico cells (also referred to as "inter-tier MLB"). In other words, when one of the cells in the grid or across layer is in an overload situation, whether measured by metrics such as physical resource blocks PRBs, transport resources, number of UEs, cell throughput, CPU utilization, and/or memory consumption, the overloaded cell may offload a portion of its traffic to more lightly loaded neighbor cells. For effective MLB to occur, existing methods rely on cooperation between an overloaded cell and an under-loaded cell or cells. Cooperation may take the form of radio resource utilization information exchange (i.e., "PRBs") and mobility parameter information exchange (i.e., handover parameters) between a source cell and target cell(s). In LTE, handover parameters at the source base station, such as cell individual offset ("CIO") and cell frequency offset ("CFO") can be biased (i.e., reduced or increased) relative to neighbor cells to which it intends to load balance (i.e., shed) its users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes monitoring a plurality of neighboring nodes to detect attempts to perform mobility load balancing by the neighboring nodes; detecting an attempt to perform mobility load balancing by at least one neighboring node; determining an identity of the at least one of the neighboring nodes; and setting an offset parameter for the identified neighboring node(s) to an optimal value. The monitoring may include monitoring a number of handover requests received within a predetermined time period. The detecting may include detecting that the number of handover requests received within the predetermined time period exceeds a predetermined number. The determining may include determining a source of each of the received handover requests, which may be accomplished by examining a user equipment history included in each of the received handover requests or by performing an iterative elimination process with respect to the neighboring nodes.

In some embodiments, the setting may include reducing the value of the offset parameter by a predetermined amount; monitoring a number of handover requests for the neighboring cell; determining whether a flurry is detected; and repeating the reducing, monitoring, and determining until a flurry is detected. In some embodiments, each of the neighboring nodes comprises a cell of a radio access network.

Example Embodiments

To prevent users offloaded to target neighbor cells from returning to the source cell in less than a critical time (i.e., "ping-pong") and to enable effective MLB, handover parameters including cell offsets are exchanged to allow target cell(s) to modify their handover settings. The exchange of handover parameters typically occurs over an X2 interface. Mutual information of the appropriate cell individual offset ("CIO") is known both at the source and target cells in the case where X2 is implemented, thereby enabling a straightforward MLB to occur. In situations in which there is no X2 interface, the target cell is unaware of the origination of the traffic, as well as the appropriate mobility setting to be used relative to the source cell to enable effective MLB. The X2-less situation is likely to occur in a multi-vendor heterogeneous radio network environment, typical inter-tier (e.g., between small cells and macro eNodeBs ("eNBs") of different vendors).

Embodiments described herein propose an X2-less MLB that is effective in both homogenous ("intra-tier") as well as heterogeneous ("inter-tier") networks. As used herein, "X2-less" refers to network implementations in which there is no X2 interface (and only S1 handover is possible), the X2 interface is temporarily or permanently unavailable, or there is an X2 interface, but loading as well as mobility information is not mutually exchanged (e.g., NO X2 AP: Radio Resource status update, or X2 AP: Mobility change request message configured).

Figure 1:
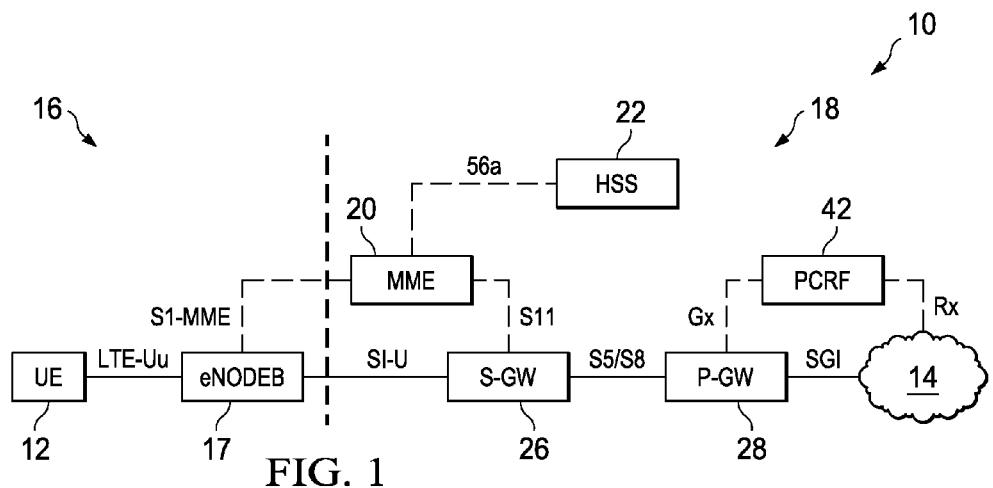
FIG. 1 is a simplified block diagram of a cellular communications environment in which a blind mobility load balancing technique in accordance with embodiments described herein may be implemented.

Referring now to FIG. 1, illustrated therein is a block diagram of a cellular communications system 10 in which an X2-less (or "blind") MLB between source and target cells may be implemented in accordance with features described herein. According to an embodiment, the system 10 operates to provide services, such as mobile communication sessions, to endpoints, represented in FIG. 1 by user equipment ("UE") 12 communication session may refer to active communication between endpoints. The system 10 provides communication services for UE 12 using any suitable cellular protocol and technology. The system 10 may use various cellular protocols and technologies, including but not limited to 3G and 4G protocols and technologies. In one embodiment, at least a portion of the system 10 is implemented as a Long Term Evolution ("LTE") network. Information such as voice, data, text, audio, video, multimedia, control, signaling other information, or any combination of the preceding, may be communicated during a communication session. Such information may be communicated in packets or any other format in accordance with a variety of protocols. A packet may comprise a bundle of data organized in a particular way for transmission and a frame may comprise the payload of one or more packets organized in a specific manner for transmission. A packet-based communication protocol, such as Internet Protocol ("IP"), may be used to communicate the packets.

UE 12 represents any suitable device operable to communicate within a communications network via a wireless link and comprises any suitable arrangement of components operable to form the operations of UE 12, including logic, a user interface, memory, other components, or any suitable combination of the preceding. UE 12 may comprise, for example, a personal digital assistant, a laptop computer, a cellular telephone, a mobile handset, or any other device operable to communicate with system 10. As illustrated in FIG. 1, the system 10 enables UE 12 to be connected to communicate data to and from the Internet 14 via a radio access network ("RAN") 16 comprising a plurality of RAN nodes, represented in FIG. 1 by a RAN node 17, and a core network 18. In one embodiment, the RAN 16 is implemented as an E-UTRAN, in which the RAN nodes comprise eNBs; however, it will be recognized that the RAN 16 may also be implemented using radio network controllers ("RNCs") instead of or in addition to eNBs for the RAN nodes. In one embodiment, the core network 18 may be implemented using an Evolved Packet Core ("EPC") network as defined in 3GPP TS 23.401 and employing a user plane protocol GTPv1-U. It will be understood, however, that other implementations of the core network 18 may be employed in accordance with the features described herein.

As illustrated in FIG. 1, the core network 18 may include a mobility management entity ("MME") 20, which is responsible for control plane functions related to subscriber and session management and is connected to a home subscriber service ("HSS") 22, which supports a database that includes user subscription information, through an S6a interface. The core network 18 may further include a serving GPRS support node ("SGSN") (not shown) connected to the MME 20 via an S3 interface for providing functionality related to packet-data switching. The core network 18 may further include a serving gateway ("SGW") 26, which is the termination point of the user plane interface S1-U toward the RAN network 16, and a PDN gateway ("PGW") 28, which serves as an interface to the Internet, sending user data from the user toward the Internet and receiving data destined for the user from the Internet. In addition, the PGW supports policy enforcement features that apply operator-defined rules for resource allocation and usage, as well as packet filtering and inspection and charging support. The PGW 28 may interface with a policy charging rule function ("PCRF") 42, which manages the service policy and provides QoS information for each user session. It will be recognized that the core network 18 may provide a variety of functionality in the system 10, including, for example, one or more of aggregation, user authentication, call control and switching, accounting and charging, service invocation, and gateways.

MME 20 also provides the control plane function for mobility between LTE and 2G/3G access networks, such as GSM Edge Radio Access Network ("GERAN") and Universal Terrestrial Radio Access Network ("UTRAN"), with the S3 interface, terminating at MME 20 from the SGSN.

As previously noted, in one embodiment, the system 10 is implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example. UE 12 can be associated with clients, customers, or end users wishing to initiate a communication in communication system 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, SGW 26 is associated with an SGSN user plane in an IP network. SGW 26 can be configured to route and to forward user data packets, while also acting as the mobility anchor for the user plane during inter-Node B handovers. Additionally, SGW 26 can act as the anchor for mobility between LTE and other 3GPP technologies (i.e., terminating the S4 interface and relaying the traffic between 2G/3G systems and PGW 28 via the S5 interface). For idle-state, versus active-state, UEs, SGW 26 can terminate the data path and trigger paging when data arrives for UE 12. SGW 26 can also manage and store UE contexts (e.g., parameters of the IP bearer service, network internal routing information, etc.). SGW 26 can also perform replication of user traffic in case of lawful interception.

MME 20 can be configured to operate as a control node for the LTE access-network. It further can be responsible for idle mode UE tracking and paging procedures (including, for example, retransmissions). Furthermore, MME 20 can be involved in the bearer activation/deactivation process and can be responsible for choosing SGW 26 for UE 12 at the initial attach (and at time of an intra-LTE handover involving core network node relocation). MME 20 can also be responsible for authenticating the user by interacting with HSS 22. MME 20 also provides the control plane function for mobility between LTE and 2G/3G access networks, such as GSM Edge Radio Access Network ("GERAN") and Universal Terrestrial Radio Access Network ("UTRAN"), with the S3 interface, terminating at MME 20 from the SGSN. MME 20 also terminates an S6a interface toward the home HSS for roaming UEs.

Other functions of the MME 20 may include generating and allocating temporary identities to UEs, terminating Non-Access Stratum ("NAS") signaling, checking the authorization of UE 12 to camp on a service provider's Public Land Mobile Network ("PLMN"), and enforcing UE roaming restrictions. MME 20 serves as the termination point in the network for ciphering/integrity protection for NAS signaling and handles the security key management. Lawful interception of signaling is also supported by MME 20.

It will be recognized that the system 10 includes a plurality of overlapping cells, each corresponding to a respective eNB (such as eNB 17). A cell may comprise any suitable element operable to provide cellular wireless services to UE 12, as well as other mobile devices present in the service area of the cell. Each cell may provide cellular communications service in any suitable configuration and/or geographic area.

Figure 2:
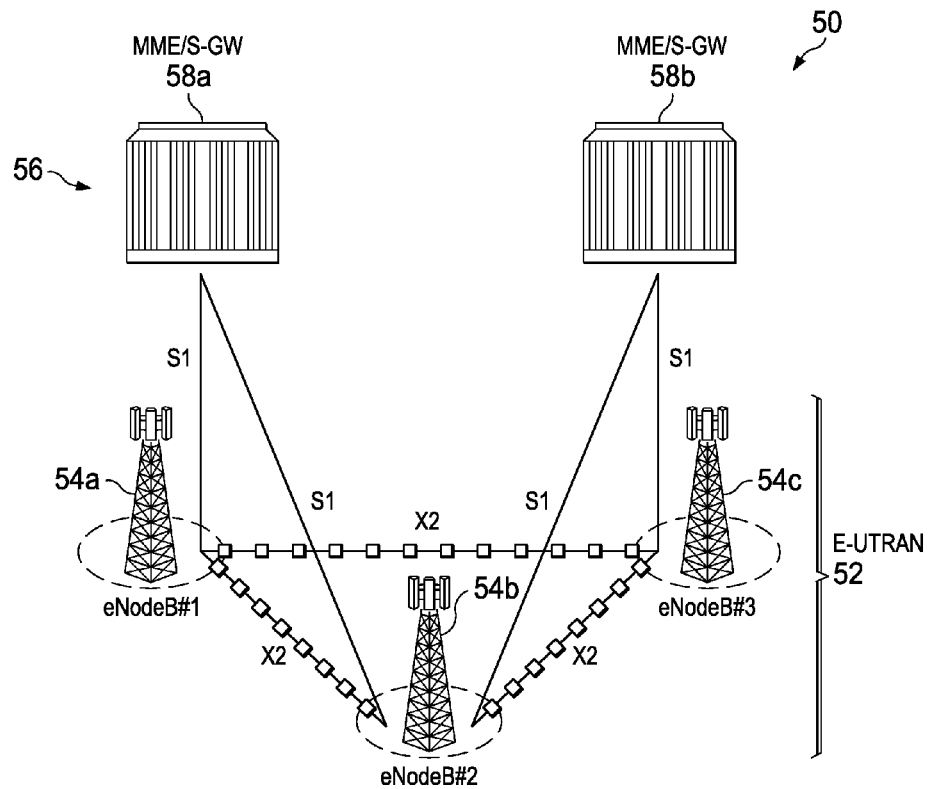
FIG. 2 is a more simplified block diagram of a cellular communications environment in which a blind mobility load balancing technique in accordance with embodiments described herein may be implemented.

FIG. 2 illustrates a more detailed block diagram of a portion of a cellular communications system 50, which in certain embodiments may be similar or identical to the system 10, in which an X2-less (or "blind") MLB between source and target cells may be implemented in accordance with features described herein. The system 50 includes a RAN 52, which in certain embodiments may comprise an LTE access network implemented in accordance with E-UTRAN architecture. As shown in FIG. 2, RAN 52 comprises a plurality of eNBs, represented by eNBs 54a-54c, connected to a core network 56, which may be implemented as an EPC. As illustrated in FIG. 2, the core network 56 comprises one or more MME/SGW pairs, represented in FIG. 2 by MME/SGWs 58a and 58b via S1 interfaces. In particular, each eNB 54a-54c is connected to one or more MMEs via an S1-MME interface and to one or more S-GW via an S1-U interface. The system 50 is responsible for all radio related functions, including Radio Resource Management ("RRM"), which covers all functions related to the radio bearers, such as radio bearer control, radio admission control, radio mobility control, scheduling, and dynamic location of resources to UEs in both uplink and downlink, as well as header compression, security, and connectivity to the EPC. On the network side, all of the above-noted functions reside in the eNBs 54a-54c, each of which may be responsible for managing multiple cells. Due to the lack of a centralized controller node, as a UE moves, the network 50 must transfer all information related to the UE (i.e., the UE context), as well as any buffered data, from one eNB to another. Mechanisms are therefore needed to avoid data loss during HO.

As with the system 10, the system 50 includes a plurality of overlapping cells, each corresponding to a respective one of eNBs 54a-54c. A cell may comprise any suitable element operable to provide cellular wireless services to UE, as well as other mobile devices present in the service area of the cell. Each cell may provide cellular communications service in any suitable configuration and/or geographic area. As illustrated in FIG. 2, in certain embodiments, X2 interfaces (represented in FIG. 2 by dashed lines) may be provided between the eNBs to enable direct communication therebetween to facilitate MLB, among other applications. As previously noted, however, in many situations, an X2 interface is not available for facilitating MLB; therefore, X2-less, or "blind," MLB in accordance with embodiments described herein below may be advantageously employed.

It will be recognized that, in cellular telecommunications, the term "handover" (or alternatively, "handoff") is used to refer to the process of transferring an ongoing call or data session from one cell to another without loss interruption of service. As previously noted, handover may be employed to effect MLB in a cellular communications network. A basic form of handover is when a call in progress is redirected from its current, or source, cell to a new, or target, cell. The target cell will by definition be one of one or more neighboring cells to the source cell.

As previously noted, to prevent users offloaded to target neighbor cells from returning to the source cell in less than a critical time (i.e., "ping-pong") and to enable effective MLB, handover parameters including cell offsets are exchanged to allow target cell(s) to modify their handover settings. The exchange of handover parameters typically occurs over an X2 interface. Mutual information of the appropriate cell individual offset (CIO) is known both at the source and target cells in the case where X2 is implemented, thereby enabling a straightforward MLB to occur. In situations in which there is no X2 interface, the target cell is unaware of the origination of the traffic, as well as the appropriate mobility setting to be used relative to the source cell to enable effective MLB. The X2-less situation is likely to occur in a multi-vendor heterogeneous radio network environment, typical inter-tier (e.g., between small cells and macro eNodeBs ("eNBs") of different vendors).

Embodiments described herein propose an X2-less MLB that is effective in both homogenous ("intra-tier") as well as heterogeneous ("inter-tier") networks. As used herein, "X2-less" refers to network implementations in which there is no X2 interface (and only S1 handover is possible), the X2 interface is temporarily or permanently unavailable, or there is an X2 interface, but loading as well as mobility information is not mutually exchanged (e.g., NO X2 AP: Radio Resource status update or X2 AP: Mobility change request message configured).

Typically, the target cell does not need cell identity information (e.g., Physical Cell Identification ("PCI") and/or Cell Global Identifier ("CGI")) for the source cell during handover. The identity information the target cell possesses is the information reported through the handover request message for user equipment ("UE") fulfilling handover criteria, such as old eNB UE application protocol ID, UE context information, UE history information, etc., which may also be carried over the S1-AP. Without knowledge of the source cell ID at the target cell, the target cell is unable to bias cell specific offsets relative to the source. As a result, a high rate of ping-pong may be observed in X2-less environments.

The embodiments presented herein are applicable to situations in which (1) UE history information is included in the handover ("HO") request message; (2) UE history information is not included in the HO request message; and/or (3) UE history information included in the HO request message is not decipherable by the target cell. UE history information is needed in situations in which a target cell needs to know from which source cell HO users originate. The target cell can use UE history information to identify a source cell. In blind MLB scenarios, in which there is no X2 interface available (i.e., only the S1 interface is available) or in which X2 resource status messages are not configured, the source eNB is unable to exchange radio resource information messages and mobility parameter information (in accordance with 3GPP TS 36.314) with the eNB of the target cell. This may result in situations in which a source cell is overloaded and wants to resolve overload by biasing its offsets towards a target cell in a blind and uncooperative way. In such situations, it may be necessary for the target cell to be able to intuitively and intelligently capture the signature for a blind MLB and arrive at local optimum RF parameters that guarantees QoS for HO users. As a result, embodiments herein implement an iterative algorithm that is executed at a target cell when blind MLB is performed at a source cell.

As described in greater detail below, embodiments herein comprise a simple, yet effective, mechanism whereby a target cell observes a "flurry of users" (parameterized) trying to handover within a specified parameterized time interval (i.e., a number of handover requests it receives within a configured short time interval). This essentially serves as the signature upon which the target cell will react. The X2-less situation is likely to occur in a multi-vendor radio network environment, typical in heterogeneous networks.

As further described herein, a three stage approach is proposed to implement X2-less MLB, including:
1. blind identification of MLB signature;
2. blind identification of MLB source; and
3. identification of optimal cell offsets at the target cell with respect to the source cell or cells (in cases in which there is more than one source cell).

Figure 3:
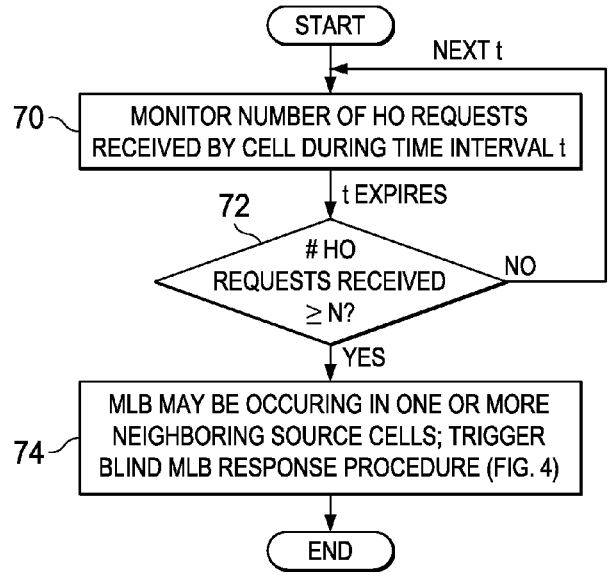
FIG. 3 is a flowchart illustrating operation of a process for blind identification of a mobility load balancing in accordance with features of embodiments described herein.

A flowchart illustrating a process for blind identification of MLB signature is illustrated in FIG. 3. In step 70, the eNB for each cell is configured to monitor the number of HO request received by the cell within a parameterized time interval t. Upon expiration of the time interval t, in step 72, a determination is made whether the cell has received N or more HO requests within the time interval t. If not, execution returns to step 70 and the number of HO request for the next instance of the time interval t is monitored. If it is determined that the cell has received N or more HO request within the time interval t, in step 74 it is determined that an MLB process may be occurring in a neighboring source cell and an blind MLB response procedure is invoked. It will be noted that the "cause IE" in the HO request message can be used in the case of intra-vendor implementation; however, "cause IE" may be interpreted differently in the case of inter-vendor implementation. As a result, embodiments herein simplify blind identification of MLB source by simply counting the number of HO requests received with a short time interval t, at which point an internal MLB response procedure is invoked. In one embodiment, t is equal to 10 ms and N is equal to three. The blind MLB response procedure relies on blind identification of MLB source, as described in detail below with reference to FIG. 4.

Figure 4:
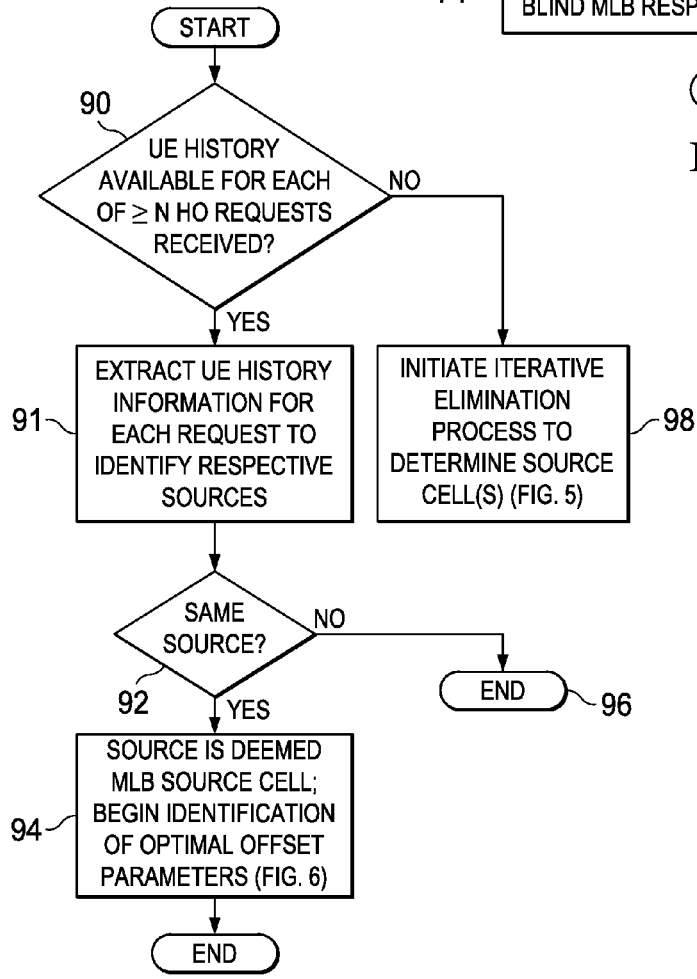
FIG. 4 is a flowchart illustrating operation of a first process for blind identification of a mobility load balancing source in accordance with features of embodiments described herein.

To accomplish blind identification of MLB source, the blind MLB algorithm reacts depending on the availability of UE history information as contained within the handover request message container sent to the target cell. FIG. 4 is a flowchart illustrating a process for blind identification of MLB source in accordance with embodiments described herein. Referring to FIG. 4, in step 90, upon detection of the blind MLB signature (FIG. 3) and subsequent invocation of the internal MLB response procedure, a determination is made whether UE history information is available for each of the N or more HO requests that triggered the invocation. If so, in step 91, the cell (or more accurately, the eNB for the cell) extracts UE history information for each of the N or more HO requests to identify the source of each. This is accomplished by reviewing the "last visited cell IE" within the UE history information IE for each of the HO requests. In step 92, a determination is made whether the UEs in N come from the same source cell. If so, in step 94, the source cell is identified as the source cell from which the UEs originate in step 92. Otherwise, in step 96, the process for blind identification of MLB source terminates. Once the source cell is identified in step 94, the process of identifying optimal offsets with respect to the source (as described in detail below with reference to FIG. 6) begins.

If in step 90 it is determined that the UE history for the HO requests is not available, in which case the target cell is unable to identify the source cell to a CGI level, the target cell needs to identify the source cell through a process of learning (step 98). In particular, as illustrated in greater detail in FIG. 6, the target cell biases its offsets by a large value δ relative to each of its neighbor cells individually. It will be recognized that the target cell biases its offsets relative to each of its neighbor cells because the target cell does not know the source. This step ensures that HO users remain sticky on the target cell and are not bounced, or ping-ponged, back to the source cell. Because large offsets are applied to all cells, handover of some users within the target cell to neighbor cells not involved in MLB may be delayed and such offsets may not be optimal for the entire target's neighbor cell. A process of MLB source identification is initiated at the target cell to proffer optimal offset parameters and ensure network stability. In particular, as shown and described in greater detail below with reference to FIG. 6, the target cell initiates a process of selective and iterative elimination of the different unknown source cells (neighbor cells), by backing off the large CIO values set in response to MLB trigger condition until it is able to identify and achieve a correct offset values relative to the originally unknown source cell(s).

Figure 5:
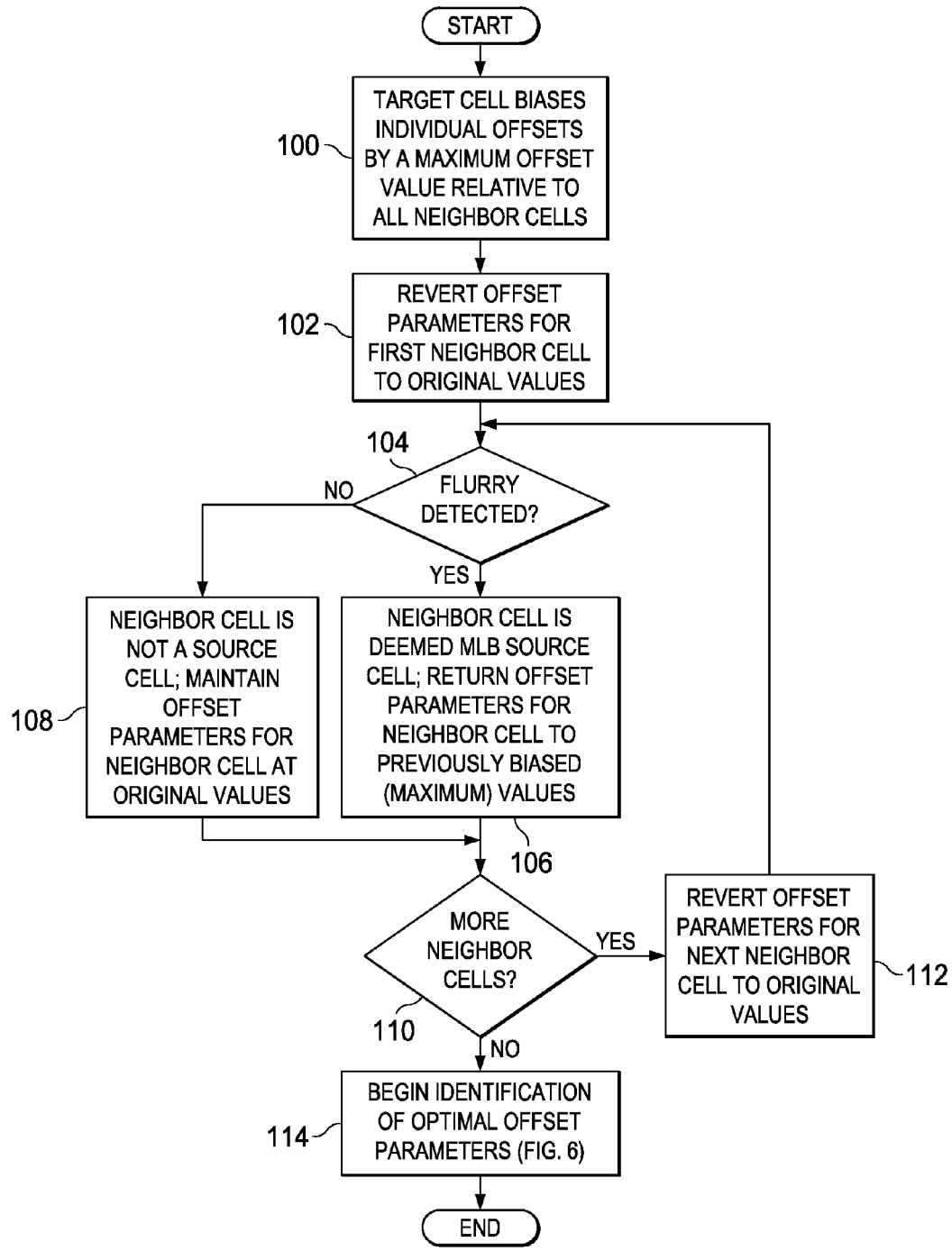
FIG. 5 is a flowchart illustrating operation of a second process for blind identification of a mobility load balancing source in accordance with features of embodiments described herein.

Referring now to FIG. 5, an iterative process of blind elimination is performed. The process begins in step 100, in which the target cell biases its CIOs by a maximum offset value (δ) relative to all of its neighbor cells. This step is performed because at this point, the target cell does not know the source of the HO requests. This process ensures that handover users remain sticky on the target and are not bounce back to the source (i.e., prevents ping-pong). Since large offsets are applied to all of the neighbor cells, handover of some users within the target cell to neighbor cells not involved in MLB may be delayed and such CIOs may not be optimal for the entire target's neighbor cell. A process of MLB source identification is initiated at the target to proffer optimal CIO parameters and ensure network stability. Through a process of learning, the target cell begins a selective and iterative elimination of the different neighbor cells as source cells by backing off the large, biased, CIO values set in response to the MBL trigger condition until it is able to identify and achieve a correct value of CIO relative to the originally unknown source cell(s).

Retuning to FIG. 5, in step 102, the CIO of a particular neighbor is reverted to its original value. In step 104, a determination is made whether a flurry of users in handover mode is greater than N. If so, the current neighbor cell must be a source cell and execution proceeds to step 106, in which the previously biased values for the CIO are retained; otherwise, in step 108, the offset values revert back to the original values and the process is repeated for the remaining neighbor cells (steps 110 and 112). Once all of the cells have been processed, execution proceeds to step 114, in which the process of identifying optimal offsets with respect to the source (as described in detail below with reference to FIG. 6) begins.

It will be recognized that the iterative elimination process illustrated in FIG. 5 is performed for each of the neighbor cells until one or more source cells are identified. The process of elimination may be performed offline, with the resulting optimal CIO values applied to the live node (i.e., target cell). Alternatively, the iterative elimination process may be set just before the line that invokes the handover commands.

Figure 6:
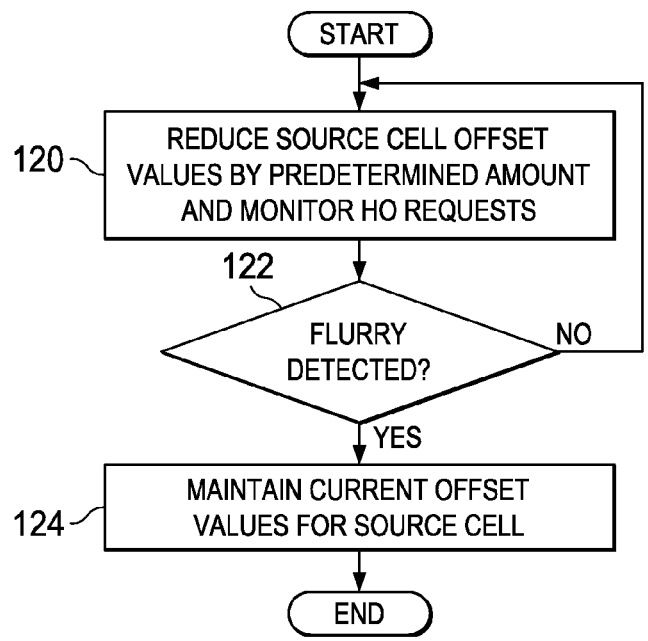
FIG. 6 is a flowchart illustrating operation of a process for identification of optimal cell offsets at a target cell with respect to one or more source cells in accordance with features of embodiments described herein.

Referring now to FIG. 6, a flowchart for identifying optimal cell offsets in accordance with one embodiment is illustrated therein. In particular, following the identification of one or more source cells, the CIOs relative to the source cell(s) can be further optimized. In particular, previously, in step 100 of FIG. 5 described above, a maximum offset value δ was applied to the identified source cell, which value may be overly aggressive. Accordingly, as illustrated in the flowchart shown in FIG. 6, at this stage, the offset values for each source cell is backed off in a stepwise fashion by applying lower step values to the cell offsets. In particular, as shown in FIG. 6, in step 120, a determination is made whether the target cell observes a flurry of users greater than the threshold N using the current offset value for the current source cell. If not, execution proceeds to step 122, in which the offset value is reduced by a predetermined amount and execution returns to step 120 (e.g., assuming a large delta value of 6 dB was applied, a stepwise delta of 0.5 or 1 may be used in the reduction process). Once a positive determination is made in step 120, in step 124, the offset value is set to the next best cell offset before the large HO conditions (i.e., flurry) were observed. This process is repeated for each identified source cell and optimal values for CIOs are reached at the target cell relative to each identified source cell. As a result, embodiments described herein provide an efficient response mechanism to MLB in situation in which there is no X2 communication available.

In one example implementation, various network nodes, and particularly the eNBs for implementing the target cells described herein, can include software for achieving the described functions. For example, referring to FIG. 7, one or more such network nodes for implementing the embodiments described herein, represented in FIG. 7 by an node 130, may include a blind MLB module 132, which comprises software embodied in one or more tangible media for facilitating the activities described herein. In particular, the blind MLB module 132 comprises software for facilitating the processes illustrated in and described with reference to FIGS. 3-6. The node 130 may also include a memory device 134 for storing information to be used in achieving the functions as outlined herein. Additionally, the node 130 may include a processor 136 that is capable of executing software or an algorithm (such as embodied in module 132) to perform the functions as discussed in this Specification.

Figure 7:
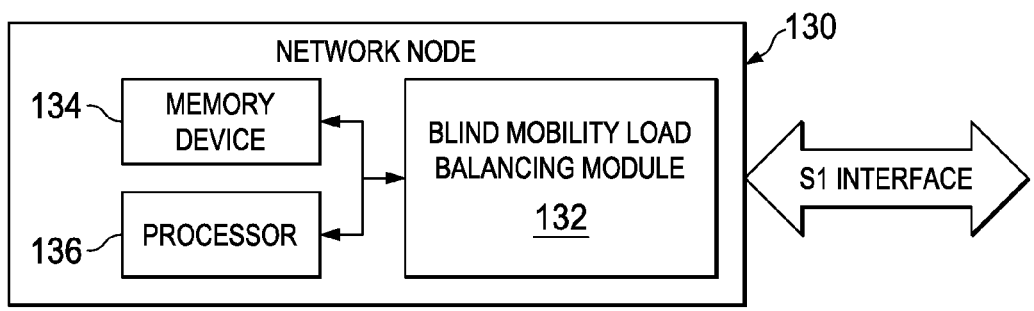
FIG. 7 is a block diagram illustrating a network node for implementing a blind mobility load balancing technique in accordance with embodiments described herein.

Although the examples are described with reference to a cellular telecommunications network, it will be recognized that the techniques are equally applicable to other network technologies. In one example implementation, various devices involved in implementing the embodiments described herein can include software for achieving the described functions. For example, as shown in FIG. 7, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 3-6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 3-6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 3-6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   monitoring a plurality of neighboring nodes to detect attempts to perform mobility load balancing ("MLB") by the neighboring nodes;
   detecting an attempt to perform mobility load balancing by at least one of the neighboring nodes;
   determining an identity of the at least one of the neighboring nodes; and
   setting an offset parameter for the identified at least one of the neighboring nodes to an optimal value, wherein the setting further comprises:
   reducing the value of the offset parameter by a predetermined amount;
   monitoring a number of handover requests for the neighboring cell;
   determining whether a flurry is detected; and
   repeating the reducing, monitoring, and determining until a flurry is detected.

2. The method of claim 1, wherein the monitoring comprises monitoring a number of handover requests received within a predetermined time period.

3. The method of claim 2, wherein the detecting comprises detecting that the number of handover requests received within the predetermined time period exceeds a predetermined number.

4. The method of claim 2, wherein the determining comprises determining a source of each of the received handover requests.

5. The method of claim 4, wherein the determining a source for each of the received handover requests comprises examining a user equipment history included in each of the received handover requests.

6. The method of claim 4, wherein the determining a source for each of the received handover requests comprises performing an iterative elimination process with respect to all of the neighboring nodes.

7. The method of claim 1, wherein each of the neighboring nodes comprises a cell of a radio access network.

8. Non-transitory tangible media having encoded thereon logic that includes instructions for execution and when executed by a processor operable to perform operations comprising:
  monitoring a plurality of neighboring nodes to detect attempts to perform mobility load balancing ("MLB") by the neighboring nodes;
  detecting an attempt to perform mobility load balancing by at least one of the neighboring nodes;
  determining an identity of the at least one of the neighboring nodes; and
  setting an offset parameter for the identified at least one of the neighboring nodes to an optimal value, wherein the setting further comprises:
    reducing the value of the offset parameter by a predetermined amount;
    monitoring a number of handover requests for the neighboring cell;
    determining whether a flurry is detected; and
    repeating the reducing, monitoring, and determining until a flurry is detected.

9. The media of claim 8, wherein the monitoring comprises monitoring a number of handover requests received within a predetermined time period.

10. The media of claim 9, wherein the detecting comprises detecting that the number of handover requests received within the predetermined time period exceeds a predetermined number.

11. The media of claim 9, wherein the determining comprises determining a source of each of the received handover requests.

12. The media of claim 11, wherein the determining a source for each of the received handover requests comprises examining a user equipment history included in each of the received handover requests.

13. The media of claim 11, wherein the determining a source for each of the received handover requests comprises performing an iterative elimination process with respect to all of the neighboring nodes.

14. An apparatus, comprising:
  a memory for storing data; and
  a processor operable to execute instructions associated with the data, wherein the processor and the memory cooperate such that the apparatus is configured for:
    monitoring a plurality of neighboring nodes to detect attempts to perform mobility load balancing ("MLB") by the neighboring nodes;
    detecting an attempt to perform mobility load balancing by at least one of the neighboring nodes;
    determining an identity of the at least one of the neighboring nodes; and
    setting an offset parameter for the identified at least one of the neighboring nodes to an optimal value, wherein the setting further comprises:
    reducing the value of the offset parameter by a predetermined amount;
    monitoring a number of handover requests for the neighboring cell;
    determining whether a flurry is detected; and
    repeating the reducing, monitoring, and determining until a flurry is detected.

15. The apparatus of claim 14, wherein the monitoring comprises monitoring a number of handover requests received within a predetermined time period, and wherein the detecting comprises detecting that the number of handover requests received within the predetermined time period exceeds a predetermined number.

16. The apparatus of claim 15, wherein the determining comprises determining a source of each of the received handover requests.

17. The apparatus of claim 16, wherein the determining a source for each of the received handover requests comprises examining a user equipment history included in each of the received handover requests.

18. The apparatus of claim 16, wherein the determining a source for each of the received handover requests comprises performing an iterative elimination process with respect to all of the neighboring nodes.

19. A method comprising:
  monitoring a plurality of neighboring nodes to detect attempts to perform mobility load balancing ("MLB") by the neighboring nodes, wherein the monitoring comprises monitoring a number of handover requests received within a predetermined time period;
  detecting an attempt to perform mobility load balancing by at least one of the neighboring nodes;
  determining an identity of the at least one of the neighboring nodes;
  identifying a source for each of the received handover requests, wherein the identifying includes examining a user equipment history included in each of the received handover requests; and
  setting an offset parameter for the identified at least one of the neighboring nodes to an optimal value.

20. Non-transitory tangible media having encoded thereon logic that includes instructions for execution and when executed by a processor operable to perform operations comprising:
  monitoring a plurality of neighboring nodes to detect attempts to perform mobility load balancing ("MLB") by the neighboring nodes, wherein the monitoring comprises monitoring a number of handover requests received within a predetermined time period;
  detecting an attempt to perform mobility load balancing by at least one of the neighboring nodes;
  determining an identity of the at least one of the neighboring nodes;
  identifying a source for each of the received handover requests, wherein the identifying includes examining a user equipment history included in each of the received handover requests; and
  setting an offset parameter for the identified at least one of the neighboring nodes to an optimal value.

21. An apparatus, comprising:
  a memory for storing data; and
  a processor operable to execute instructions associated with the data, wherein the processor and the memory cooperate such that the apparatus is configured for:
    monitoring a plurality of neighboring nodes to detect attempts to perform mobility load balancing ("MLB") by the neighboring nodes, wherein the monitoring comprises monitoring a number of handover requests received within a predetermined time period;
    detecting an attempt to perform mobility load balancing by at least one of the neighboring nodes;
    determining an identity of the at least one of the neighboring nodes;

identifying a source for each of the received handover requests, wherein the identifying includes examining a user equipment history included in each of the received handover requests; and setting an offset parameter for the identified at least one of the neighboring nodes to an optimal value.

* * * * *